(12) United States Patent
Igarashi et al.

(10) Patent No.: US 7,610,817 B2
(45) Date of Patent: Nov. 3, 2009

(54) ORIFICE MEMBER, AND DIFFERENTIAL-PRESSURE FLOW METER AND FLOW-REGULATING APPARATUS USING THE SAME

(75) Inventors: Hiroki Igarashi, Gyoda (JP); Yoshihiro Ushigusa, Gyoda (JP); Masahiro Hasunuma, Gyoda (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 0 days.

(21) Appl. No.: 11/915,268

(22) PCT Filed: May 29, 2006

(86) PCT No.: PCT/JP2006/310641

§ 371 (c)(1),
(2), (4) Date: Dec. 28, 2007

(87) PCT Pub. No.: WO2006/129588

PCT Pub. Date: Dec. 7, 2006

(65) Prior Publication Data

US 2008/0210017 A1 Sep. 4, 2008

(30) Foreign Application Priority Data

Jun. 3, 2005 (JP) ............................. 2005-163691

(51) Int. Cl.
*G01F 1/37* (2006.01)
(52) U.S. Cl. .................................................. 73/861.52
(58) Field of Classification Search ............. 73/861.52, 73/54.01, 40.5; 137/814
See application file for complete search history.

(56) References Cited

U.S. PATENT DOCUMENTS

| 3,894,562 | A | | 7/1975 | Moseley, Jr. et al. |
| 4,347,733 | A | * | 9/1982 | Crain ...................... 73/40.5 R |
| 5,152,499 | A | | 10/1992 | Silverman et al. |
| 6,553,812 | B2 | * | 4/2003 | Park et al. .................. 73/54.01 |
| 6,568,477 | B1 | | 5/2003 | Dveyrin |
| 2003/0172742 | A1 | | 9/2003 | Brookshire et al. |

FOREIGN PATENT DOCUMENTS

DE        40 15 107 A1    11/1991

(Continued)

*Primary Examiner*—Jewel Thompson
(74) *Attorney, Agent, or Firm*—Barnes & Thornburg LLP

(57) ABSTRACT

Provided are an orifice member, and a differential-pressure flow meter and a flow-regulating device using the orifice member, that allow purging to be carried out easily when changing the fluid to be circulated, that are less likely to cause contamination and leaching of impurities to the circulated fluid, and that can be easily produced. The flow-regulating device includes a first pressure-measuring device (object to be connected to) that is connected to one end of the orifice member, and a second pressure-measuring device (object to be connected to) that is connected to the other end of the orifice member, and a flow-regulating valve that is connected to the downstream side of the differential-pressure flow meter, which includes the above-mentioned units. In the orifice member, a tube portion, one end of which is connected to the first pressure-measuring device and other end of which is connected to the second pressure-measuring device and whose internal part forms a channel connecting the first and second pressure-measuring devices, and an orifice provided inside the tube portion are integrated.

16 Claims, 13 Drawing Sheets

FOREIGN PATENT DOCUMENTS

| | | |
|---|---|---|
| EP | 0 496 068 A1 | 7/1992 |
| EP | 1 944 583 A1 | 7/2008 |
| GB | 2 301 676 A | 12/1996 |
| JP | H4-1525 A | 1/1992 |
| JP | H8-256972 A | 10/1996 |
| JP | 2002-66795 A | 3/2002 |
| JP | 2003-194283 A | 7/2003 |

* cited by examiner

ORIFICE MEMBER, AND DIFFERENTIAL-PRESSURE FLOW METER AND FLOW-REGULATING APPARATUS USING THE SAME

CROSS-REFERENCE TO RELATED APPLICATIONS

This application is a National Phase Application based upon and claiming the benefit of priority to PCT/JP2006/310641, filed on May 29, 2006, which is based upon and claims the benefit of priority to Japanese Patent Application No. 2005-163691, filed Jun. 3, 2005, the contents of both of which are incorporated herein by reference.

TECHNICAL FIELD

The present invention relates to an external orifice member used for a fluid transportation channel in, for example, fluid transportation piping used in various industrial fields, including chemical plants, semiconductor production, food production, and biotechnology, and relates to a differential-pressure flow meter and flow-regulating apparatus using the same.

BACKGROUND ART

An orifice member is used as a component of, for example, a differential-pressure flow meter or a flow-regulating device installed in a fluid transportation channel. A known example of such an orifice member is an orifice device described below in Patent Document 1.

This orifice device is formed by inserting an orifice inside a tube that has joints at both ends. The space between the tube and the orifice is sealed with, for example, an O-ring.

Patent Citation 1: Japanese Unexamined Patent Application, Publication No. 2003-194283.

DISCLOSURE OF INVENTION

However, in this orifice device, since the tube and the orifice are provided as separate members, a joint is formed between the tube and the orifice. This joint may cause accumulation of fluid. Thus, to handle fluid such as extremely pure fluid, such as chemicals used in semiconductor production, sufficient purging is required when changing the fluid being circulated so that contamination of the newly circulated fluid does not occur.

Moreover, the tube and the orifice can be made of materials that are less likely to cause contamination and leaching of impurities. However, the O-ring used to seal the tube and the orifice is limited to materials that maintain the sealing performance.

Therefore, there is a possibility of impurities from the O-ring leaching into the fluid circulated through the orifice device. Depending on the properties of the circulated fluid and the degree of purity required for the fluid, in some cases, this orifice member cannot be used.

Furthermore, in this orifice device, since the tube and the orifice are separate members, assembly of the orifice device becomes complicated.

The present invention has been conceived in light of the problems described above. Accordingly, it is an object of the present invention to provide an orifice member, as well as a differential-pressure flow meter and a flow-regulating device using the orifice member, wherein a purging operation carried out when changing the circulated fluid is simplified, contamination and leaching of impurities into the circulated fluid is less likely to occur, and manufacturing is easy.

To solve the above-described problems, the present invention provides the following solutions.

A first aspect of the present invention provides an orifice member including a tube portion whose ends are each connected to an object and whose inner section forms a channel connecting the objects; and an orifice provided inside the tube portion, wherein the tube portion and the orifice are integrated.

The orifice member having such a structure is used as an orifice by connecting both ends of the tube portion to objects such as pipelines or various devices. The connection structure between the tube portion and the objects may be a standard connection structure.

With this orifice member, the tube portion and the orifice are integrated (in other words, the tube portion and the orifice are provided as single member), and there is no joint, which may cause accumulation of fluid, between the tube portion and the orifice.

Therefore, in the orifice member, when the fluid circulated through the channel is changed, the remaining fluid in the channel is reliably pushed out by the fluid newly supplied to the channel, and the fluid in the channel can be quickly changed.

Furthermore, in the orifice member, since the tube portion and the orifice are integrated, only a small number of components is required, production is easy, and a member, such as an O-ring, that may cause contamination of the channel does not have to be provided.

Such an orifice member can be manufactured by injection molding using a mold or by machining (cutting etc.).

In this orifice member, on at least one of the ends of the tube portion, a nut through which the end of the tube portion is passed and a sleeve inserted into the end of the tube portion and forming a large-diameter portion by widening the section near the end of the tube portion outwards in the radial direction may be provided, and, on the inner circumferential surface of the nut, a female threaded portion and an engagement protrusion may provided, the engagement protrusion engaging with the large-diameter portion and protruding from the center area in the longitudinal direction of the tube portion, farther inward in the radial direction than the female threaded portion.

In the orifice member having such a structure, the end of the orifice which is passed through the nut (hereinafter, referred to as the "connection end") is connected to the object to be connected to, which has a male threaded portion formed on the outer circumferential surface of the connection end for connecting to the tube portion.

The connection end of the tube portion is inserted into the nut whose inner circumferential surface includes the engagement protrusion. Then, the sleeve is inserted into the connection end to form, near the end, the large-diameter portion that engages with the engagement protrusion.

In the orifice member, by engaging the nut through which the tube portion is passed with the male threaded portion of the connection end of the object and tightening the nut while the connection end of the tube portion is facing the connection end of the object, the connection end of the tube portion moves relatively close to the connection end of the object. When the nut is sufficiently tightened, the connection end of the tube portion and the connection end of the object are fixed in an airtight, liquid-tight manner.

By loosening the nut, the connection end of the tube portion and the connection end of the object are freed.

In other words, in this orifice member, connection and disconnection with the object can be easily carried out by moving the nut.

In this orifice member, the sleeve may be an engagement portion that is shaped to engage with the connection end of the object.

In such a case, the connection end of the tube portion and the connection end of the object can be satisfactorily connected.

The orifice member according to the present invention, instead of having a structure as described above in which the sleeve is inserted into the connection end of the tube portion, for example, may have a structure in which, on at least one of the ends of the tube portion, a nut through which the end of the tube portion is passed is provided; the end of the tube portion passing through the nut comprises a large-diameter portion having flexibility, having a diameter larger than other sections, and internally receiving a connection end of the object; and on the inner circumferential surface of the nut, a female threaded portion and an engagement protrusion are provided, the engagement protrusion engaging with the large-diameter portion and protruding from the center area in the longitudinal direction of the tube portion, farther inward in the radial direction than the female threaded portion.

The orifice member having such a structure is connected to the object whose tube-portion-connecting end forms an insertion portion that is inserted into the connection end of the tube portion and whose outer circumferential surface near the tube-portion-connecting end is provided with a male threaded portion.

At least one of the ends of the tube portion is flexible and is inserted into the nut having the engagement protrusion on inner circumferential surface. The section near the end inserted into the nut of the tube portion has diameter larger than other sections. This large-diameter portion engages with the engagement protrusion formed on the inner circumferential surface of the nut by internally receiving the insertion portion of the object and by its deformation being restricted.

Therefore, by engaging the nut through which the tube portion is passed with the male threaded portion of the connection end of the object and tightening the nut while the connection end of the tube portion is facing the connection end of the object and the insertion portion of the object is inserted into the large-diameter portion of the tube portion, the connection end of the tube portion moves, together with the nut, relatively close to the connection end of the object. When the nut is sufficiently tightened, the connection end of the tube portion and the connection end of the object are fixed in an airtight, liquid-tight manner.

By loosening the nut, the connection end of the tube portion and the connection end of the object are freed.

In other words, in this orifice member, connection and disconnection of the object can be easily carried out by moving the nut.

The orifice member according to the present invention, instead of having a structure as described above in which the sleeve or the connection end of the object is inserted into the connection end of the tube portion, for example, may have a structure in which, on at least one of the ends of the tube portion, a nut through which the end of the tube portion is passed is provided; the end of the tube portion passing through the nut is rigid and a large-diameter portion is provided on the outer circumferential surface; and on the inner circumferential surface of the nut, a female threaded portion and an engagement protrusion are provided, the engagement protrusion engaging with the large-diameter portion and protruding from the center area in the longitudinal direction of the tube portion, farther inward in the radial direction than the female threaded portion.

The connection end of the tube portion of the orifice member having such a structure is connected to the object whose outer circumferential surface at the tube-portion-connecting end is provided with a male threaded portion.

The connection end of the tube portion is inserted into the nut having the engagement protrusion on the inner circumferential surface, the section near the connection end inserted into the nut is rigid, and the large-diameter portion is formed on the outer circumferential surface of the section near the connection end.

Therefore, by engaging the nut through which the tube portion is passed with the male threaded portion of the connection end of the object and tightening the nut while the connection end of the tube portion is facing the connection end of the object, the connection end of the tube portion moves, together with the nut, relatively close to the connection end of the object. Then, when the nut is sufficiently tightened, the connection end of the tube portion and the connection end of the object are fixed in an airtight, liquid-tight manner.

By loosening the nut, the connection end of the tube portion and the connection end of the object are freed.

In other words, in this orifice member, connection and disconnection of the object can be easily carried out by moving the nut.

With this orifice member, it is preferable to form at least one of the large-diameter portion of the tube portion and the engagement protrusion of the nut in a shape that allows the nut to easily pass over the large-diameter portion when the end of the tube portion is inserted into the nut and that reliably transmits the tightening force of the nut to the large-diameter portion.

For example, when the large-diameter portion of the tube portion satisfies the above-described condition, it is preferable that the large-diameter portion be formed in a shape such that the diameter at the connection end gradually decreases toward the connection end, and the center area in the longitudinal direction of the tube portion has a surface substantially orthogonal to the axis.

When the engagement protrusion of the nut satisfies the above-described conditions, it is preferable that the engagement protrusion be formed in a shape such that the side having the female threaded portion in the axial direction of the nut has a surface substantially orthogonal to the axis, and the diameter of the side opposite to the female threaded portion in the axial direction of the nut gradually decreases away from the female threaded portion in the axial direction.

The orifice member according to the present invention, instead of having a structure as described above in which the nut is provided on the tube portion, for example, may have a structure in which at least one of the ends of the tube portion is rigid and comprises an engagement portion engaging the tube portion with a tube-portion-connecting end of the object, and a male threaded portion is provided on the outer circumferential surface of the engagement portion.

The engagement portion of the tube portion of the orifice member having such a structure is connected to the tube-portion-connecting end of the object having a connection structure that is the same as the connection structure of the above-described orifice member connecting with the object (when the connection end of the object is a flexible large-diameter portion, the end of the engagement portion of the tube portion has an insertion portion that is inserted into the large-diameter portion of the object).

In other words, in this orifice member, by engaging the nut through which the tube portion is passed with the male threaded portion of the connection end of the object and tightening the nut while the connection end of the tube portion is facing the connection end of the object, the connection end of the tube portion moves, together with the nut, relatively close to connection end of the object. Then, when the nut is sufficiently tightened, the connection end of the tube portion and the connection end of the object are fixed in an airtight, liquid-tight manner.

By loosening the nut, the connection end of the tube portion and the connection end of the object are freed.

In other words, in this orifice member, connection and disconnection with the object can be easily carried out by moving the nut.

In the above-described orifice member whose connection end of the tube portion is rigid, the end of the tube portion forms an engagement portion having a shape for engaging with the tube-portion-connecting end of the object.

In such a case, the connection end of the tube portion and the connection end of the object can be satisfactorily connected.

A second aspect of the present invention provides a differential-pressure flow meter including the orifice member according to the present invention, a first pressure-measuring device being connected to one end of the tube portion of the orifice member, and a second pressure-measuring device being connected to the other end of the tube portion of the orifice member.

In the differential-pressure flow meter having such a structure, an orifice member that does not have a joint, which may cause accumulation of fluid, is used between the tube portion and the orifice. Therefore, when the fluid circulated through the channel is changed, the remaining fluid in the channel is reliably pushed out by the fluid newly supplied to the channel, and the fluid in the channel can be quickly changed.

Furthermore, in the orifice member, since the tube portion and the orifice are integrated, only a small number of components is required, production is easy, and a member, such as an O-ring, that may cause contamination of the channel does not have to be provided.

A third aspect of the present invention provides a flow-regulating device including a differential-pressure flow meter using the orifice member according to the present invention, and a flow-regulating valve connected to the upstream or downstream side of the differential-pressure flow meter.

In the flow-regulating device having such a structure, an orifice member of the differential-pressure flow meter does not have a joint, which may cause accumulation of fluid, between the tube portion and the orifice. Therefore, when the fluid circulated through the channel is changed, the remaining fluid in the channel is reliably pushed out by the fluid newly supplied to the channel, and the fluid in the channel can be quickly changed.

Furthermore, in the orifice member, since the tube portion and the orifice are integrated, only a small number of components is required, production is easy, and a member, such as an O-ring, that may cause contamination of the channel does not have to be provided.

With the orifice member, as well as the differential-pressure flow meter and the flow-regulating device using the orifice member, according to the present invention, purging can be carried out easily and reliably when changing the fluid to be circulated, production is easy because the number of components is small, and contamination of the circulated fluid is less likely to occur because members, such as O-rings, that may cause contamination do not have to be disposed inside the channel.

BEST MODE FOR CARRYING OUT THE INVENTION

First Embodiment

A first embodiment of a flow-regulating device according to the present invention will be described below with reference to the drawings.

Figure 1:
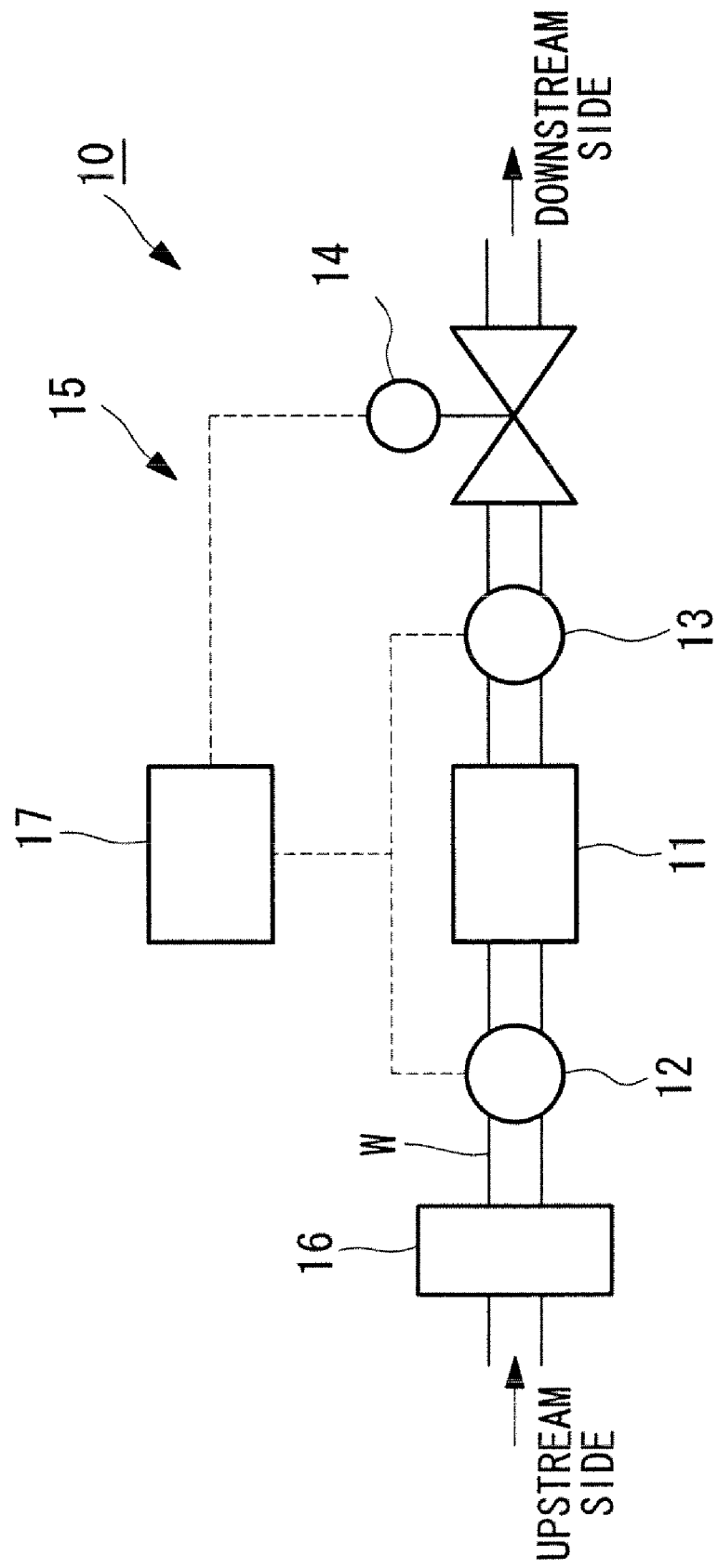
FIG. 1 is a block diagram illustrating the structure of a flow-regulating device according to a first embodiment of the present invention.

As shown in FIG. 1, a flow-regulating device 10 according to this embodiment is provided in a fluid transportation pipe W used in various industrial fields, including chemical plants, semiconductor production, food production, and biotechnology, and is used to regulate the flow of fluid supplied by back-pressure from the upstream side to the downstream side through the fluid transportation pipe W.

According to this embodiment, the flow-regulating device 10 is used for a fluid transportation pipe that transports fluid at a back-pressure of about 50 k to 500 k [Pa] by applying pressure, by pumping with a fluid-transporting pump, or by means for applying potential energy.

The flow-regulating device 10 includes an orifice member 11, a first pressure-measuring device 12 that is connected to the upstream side of the orifice member 11 to measure the fluid pressure at this position, a second pressure-measuring device 13 that is connected to the downstream side of the orifice member 11 to measure the fluid pressure at this position, and a flow-regulating valve 14 that is connected to the upstream side of the first pressure-measuring device 12 or the downstream side of the second pressure-measuring device 13 to control the flow volume of the fluid supplied from upstream to downstream.

The orifice member 11, the first pressure-measuring device 12, and the second pressure-measuring device 13, together with a control device 17 described below, form a differential-pressure flow meter 15 for measuring the flow rate of fluid passing through the flow-regulating device 10.

Here, for the differential-pressure flow meter, if P1 represents in fluid pressure upstream of the orifice, P2 represents the fluid pressure downstream of the orifice, and Q represents the flow rate of the fluid supplied to the orifice, the following Equation (1) holds:

$$Q = k\sqrt{(P1-P2)} \qquad (1)$$

The proportionality coefficient k in Equation (1) is a constant depending on the shape or hole-diameter of the orifice and is determined by actual measurements.

According to this embodiment, the flow-regulating valve 14 is connected to the downstream side of the second pressure-measuring device 13. In this way, sufficiently great back-pressure can be applied to the first and second pressure-measuring devices 12 and 13 to stabilize the properties of the first and second pressure-measuring devices 12 and 13, and the measurement accuracy of the first and second pressure-measuring devices 12 and 13 is less likely to be affected even when there is a pressure change in the fluid supplied to the flow-regulating device 10.

Moreover, according to this embodiment, a pressure-regulating valve 16 for suppressing pressure change of the fluid supplied to the first pressure-measuring device 12 so as to maintain a predetermined pressure is provided on the upstream side of the first pressure-measuring device 12.

In this way, the measurement accuracy of the first and second pressure-measuring devices 12 and 13 is less likely to be affected even when there is a pressure change in the fluid supplied to the flow-regulating device 10 due to disturbance caused by, for example, other pipe systems connected in parallel with the fluid transportation pipe W whose flow rate is to be regulated.

Here, the pressure-regulating valve 16 may be configured such that pressure regulation is carried out by manual operation conducted by an operator. In such a case, to facilitate the regulation of the pressure-regulating valve 16 by the operator, it is preferable to provide, on the first pressure-measuring device 12, a display device that allows visual confirmation of a measurement value (i.e., pressure of the fluid sent out from the pressure-regulating valve 16). The display device may be an analog meter that displays a measurement value by the position of a needle or a digital meter that displays the measurement value as a numeric value.

The pressure-regulating valve 16 may be an automatic valve, such as an air-operated valve using pneumatic pressure (electropneumatic regulator). When an air-operated valve is used as the pressure-regulating valve 16, it is not only possible to regulate the pressure of the fluid supplied to the first pressure-measuring device 12 but it is also possible to regulate the flow rate.

The flow-regulating valve 14 is configured with, for example, a throttle mechanism having a needle-valve structure and a throttle-adjusting device for adjusting the needle position of the throttle mechanism. The throttle-adjusting device includes, for example, a motor and a conversion mechanism (for example, a screw-nut system) for converting the rotation of the rotary shaft of the motor into displacement of a needle.

According to this embodiment, in the flow-regulating valve 14, a stepping motor whose rotary shaft rotation can be controlled in a highly accurate manner is used as the motor for the throttle-adjusting device. In this way, the needle position can be controlled in a highly accurate manner (i.e., the amount of throttle of the throttle mechanism can be controlled in a highly accurate manner).

The operation of this stepping motor is controlled by the control device 17. More specifically, the stepping motor rotates its rotary shaft by an angle proportional to the number of pulses in a drive signal sent from the control device 17.

The control device 17 controls the degree of opening of the flow-regulating valve 14 such that the difference between the measurement values or output voltages of the first pressure-measuring device 12 and the second pressure-measuring device 13 become a predetermined value set in advance. More specifically, when the difference of the output values or the difference of the output voltages of the pressure-measuring devices are lower than a target value set in advance, the degree of opening of the flow-regulating valve 14 is increased to increase the flow rate, whereas, when the difference of the output values or the difference of the output voltages of the pressure-measuring devices are higher than the target value, the degree of opening of the flow-regulating valve 14 is decreased to decrease the flow rate.

According to this embodiment, the control device 17 controls the flow-regulating valve 14 by using a PID control method, which has excellent control accuracy and response.

Here, the control device 17 may determine the flow rate of the fluid passing through the flow-regulating device 10 on the basis of the difference of the measurement values or output voltages of the first pressure-measuring device 12 and the second pressure-measuring device 13 and may control the degree of opening of the flow-regulating valve 14 such that the difference is eliminated.

Figure 2:
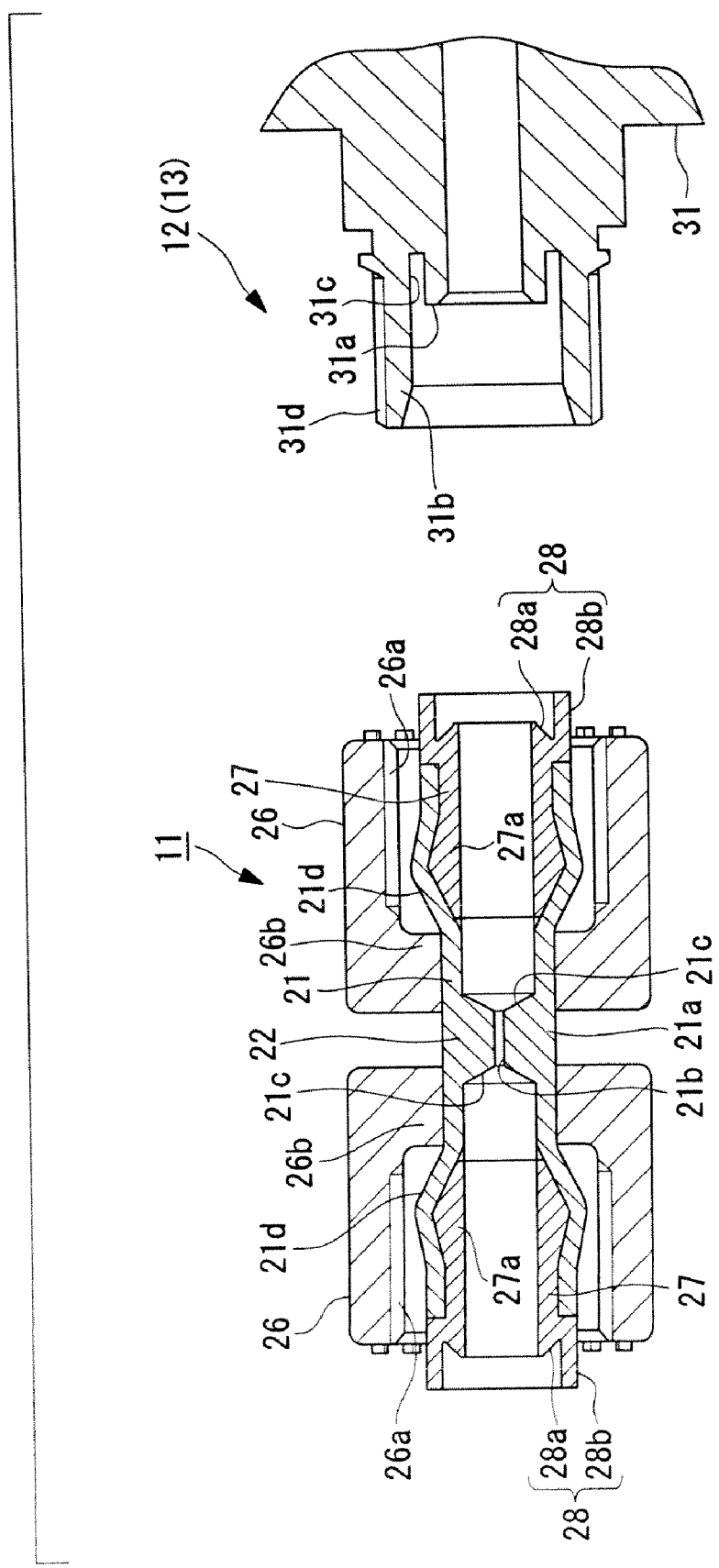
FIG. 2 is a longitudinal cross-sectional view illustrating the structures of an orifice member of the flow-regulating device and first and second pressure-measuring devices according to the first embodiment of the present invention.

As shown in FIG. 2, in the orifice member 11, a tube portion 21, one end of which is connected to the first pressure-measuring device 12 and other end of which is connected to the second pressure-measuring device 13 and whose internal part forms a channel connecting the first and second pressure-measuring devices 12 and 13, and an orifice 22 provided inside the tube portion 21 are integrated.

The orifice member 11 is formed of a material that is less likely to cause contamination of the fluid circulated through the inner channel and less likely to be affected by the fluid, for example, PFA (a copolymer of tetrafluoroethylene and perfluoroalkoxy vinyl ether).

In this embodiment, the orifice member 11 has a substantially cylindrical shape in which only a center portion 21a along the longitudinal direction of the tube portion 21 is solid. The center portion 21a in the longitudinal direction has a narrow hole 21b that connects one end to another end in the longitudinal direction and that is formed concentrically with the axis of the tube portion 21. This center portion 21a in the longitudinal direction forms the orifice 22.

In other words, in the orifice member 11, the tube portion 21 and the orifice 22 are integrated, and there is no joint between the tube portion 21 and orifice 22, which may cause accumulation of fluid.

Therefore, in the orifice member 11, when the fluid circulated through the channel is changed, the remaining fluid in the channel is reliably pushed out by the fluid newly supplied to the channel, and the fluid in the channel can be quickly changed.

Furthermore, in the orifice member 11, since the tube portion 21 and the orifice 22 are integrated, only a small number of components is required, production is easy, and a member, such as an O-ring, that may cause contamination of the channel does not have to be provided.

Such an orifice member 11 can be manufactured by injection molding using a mold or by machining (cutting etc.).

The inner surface of the tube portion 21 and the inner surface of the narrow hole 21b are connected by a tapered surface 21c whose diameter decreases from an edge, in the longitudinal direction, of the tube portion 21 toward the center in the longitudinal direction. In other words, an inclined surface following the flow of the fluid in the tube portion 21 is provided between the inner surface of the tube portion 21 and the inner surface of the narrow hole 21b, and thus the fluid that reaches the center portion 21a in the longitudinal direction in the tube portion 21 is smoothly guided to the narrow hole 21b, and the fluid that passes through the narrow hole 21b is smoothly pushed downstream. Consequently, fluid is less likely to accumulate at the boundary of the orifice 22 and the tube portion 21.

At each end of the tube portion 21, a nut 26 for inserting the end of the tube portion 21 and a sleeve 27 that is inserted into the end of the tube portion 21 and that forms a large-diameter portion 21d at the end of the tube portion 21 by widening the section near the end of the tube portion 21 outwards in the radial direction are provided.

On the nut 26, a female threaded portion 26a is provided on the inner circumferential surface, and an engagement protrusion 26b that protrudes inward in the radial direction of the nut 26 and engages with the large-diameter portion 21d is provided closer to the center portion 21a in the longitudinal direction of the tube portion 21 than the female threaded portion 26a. According to this embodiment, the engagement protrusion 26b is an internal flange that is formed around the entire circumference of the nut 26.

The sleeve 27 is a substantially cylindrical member whose internal section forms the channel and is inserted into the tube portion 21 with one end thereof protruding from the end of the tube portion 21.

In the sleeve 27, the end protruding from the end of the tube portion 21 (hereinafter this end is referred to as the "protruding end") is an engagement portion 28 that is shaped to engage with the connection ends of the first and second pressure-measuring devices 12 and 13. According to this embodiment, the engagement portion 28 includes a substantially ring-shaped contact surface 28a that surrounds the open end of the channel of the sleeve 27 and that is in surface contact with an end surface of the connection end of the first and second pressure-measuring device 12 or 13 and a cylindrical portion 28b that protrudes farther than the contact surface 28a and surrounds the contact surface 28a.

At the end of the sleeve 27 inserted in the tube portion 21, a large-diameter portion 27a that widens the tube portion 21 outwards in the radial direction is provided.

As shown in FIG. 2, the first pressure-measuring device 12 includes a housing 31 that forms a channel whose inner section connects the fluid transportation pipe W and the orifice member 11 and a main body of the measuring device (not shown) for measuring the fluid pressure in the housing 31.

Here, the second pressure-measuring device 13 has substantially the same structure as the first pressure-measuring device 12, except that the flow-regulating valve 14 is connected instead of the fluid transportation pipe W. Therefore, only the structure of the first pressure-measuring device 12 will be described, and a detailed description of the second pressure-measuring device 13 is omitted.

The housing 31 includes a substantially ring-shaped contact surface 31a that is provided on the connection end of the inner channel, connecting to the orifice member 11, and that surrounds the open end of the channel to be in surface contact with the contact surface 28a of the sleeve 27 of the orifice member 11; a cylindrical portion 31b that protrudes farther than the contact surface 31a and surrounds the contact surface 31a; and a ring-shaped depressed portion 31c that is interposed between the contact surface 31a and the cylindrical portion 31b and into which the cylindrical portion 28b of the orifice member 11 is inserted.

On the outer circumferential surface of the cylindrical portion 31b, a male threaded portion 31d that is screwed into the female threaded portion 26a of the nut 26 of the orifice member 11 is formed.

Here, a typical connection structure can be used as the connection structure for the housing 31 and the fluid transportation pipe W (in the case of the second pressure-measuring device 13, the connection structure with the flow-regulating valve 14).

Figure 3:
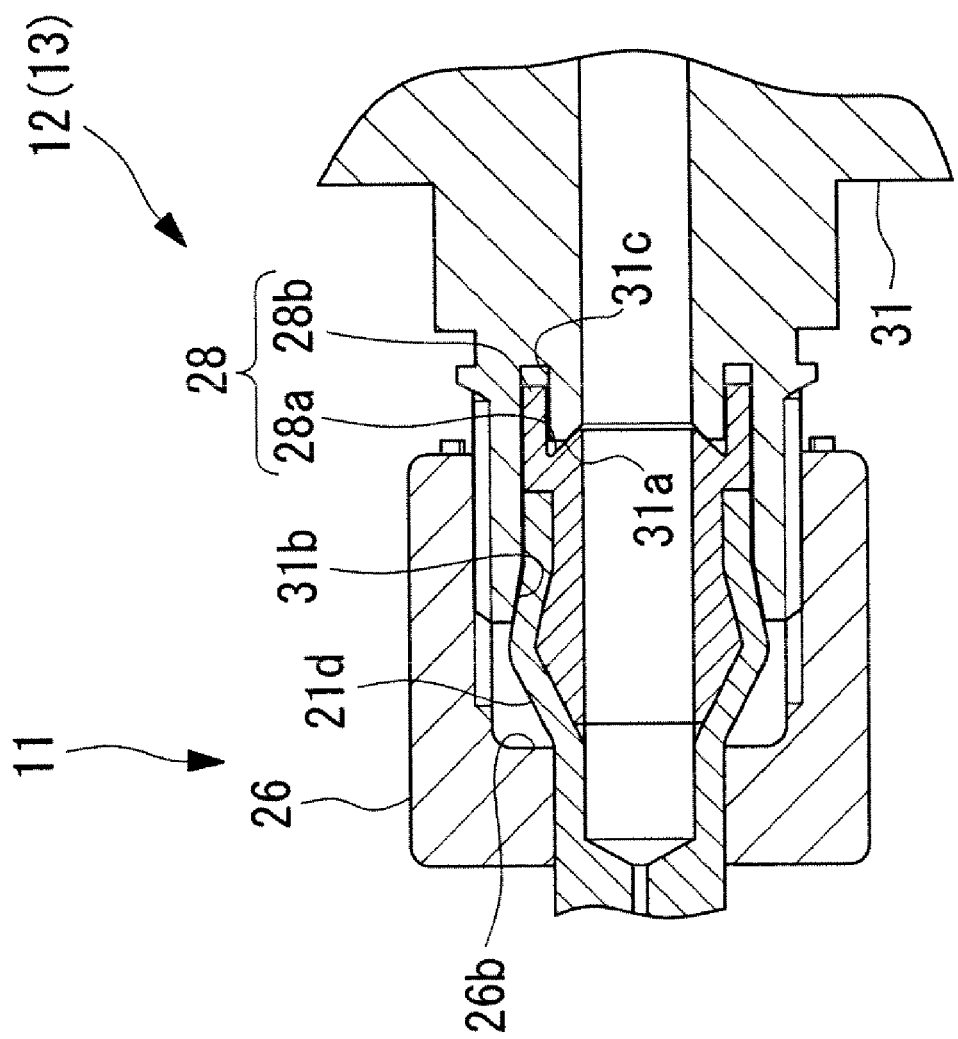
FIG. 3 is a longitudinal cross-sectional view illustrating the connection structures of the orifice member of the flow-regulating device and the first and second pressure-measuring devices according to the first embodiment of the present invention.

In the orifice member 11 of the flow-regulating device 10 having such a structure, while one end of the tube portion 21 in the longitudinal direction is facing the connection end of the channel of the first pressure-measuring device 12, the nut 26 through which this end is passed is engaged with the male threaded portion 31d provided on the cylindrical portion 31b of the housing 31 of the first pressure-measuring device 12, and the nut 26 is tightened. In this way, the engagement portion 28 of the sleeve 27 protruding from this end moves relatively close to the housing 31, together with the nut 26. When the nut 26 is sufficiently tightened, as shown in FIG. 3, the contact surface 28a forming the engagement portion 28 of the sleeve 27 and the contact surface 31a of the housing 31 are pushed towards each other while being in surface contact, and the cylindrical portion 28b forming the engagement portion 28 of the sleeve 27 is inserted into the depressed portion 31c of the housing 31. In this way, the engagement portion 28 and the housing 31 are fixed in an airtight, liquid-tight manner.

By loosening the nut 26, the fixed engagement portion 28 and the housing 31 are freed.

The connection and disconnection operations of the orifice member 11 and the second pressure-measuring device 13 are the same as the connection and disconnection operations of the orifice member 11 and the first pressure-measuring device 12.

In other words, in the orifice member 11 of the flow-regulating device 10, connection and disconnection with the pressure-measuring devices can be easily carried out by moving the nut 26.

Figure 4:
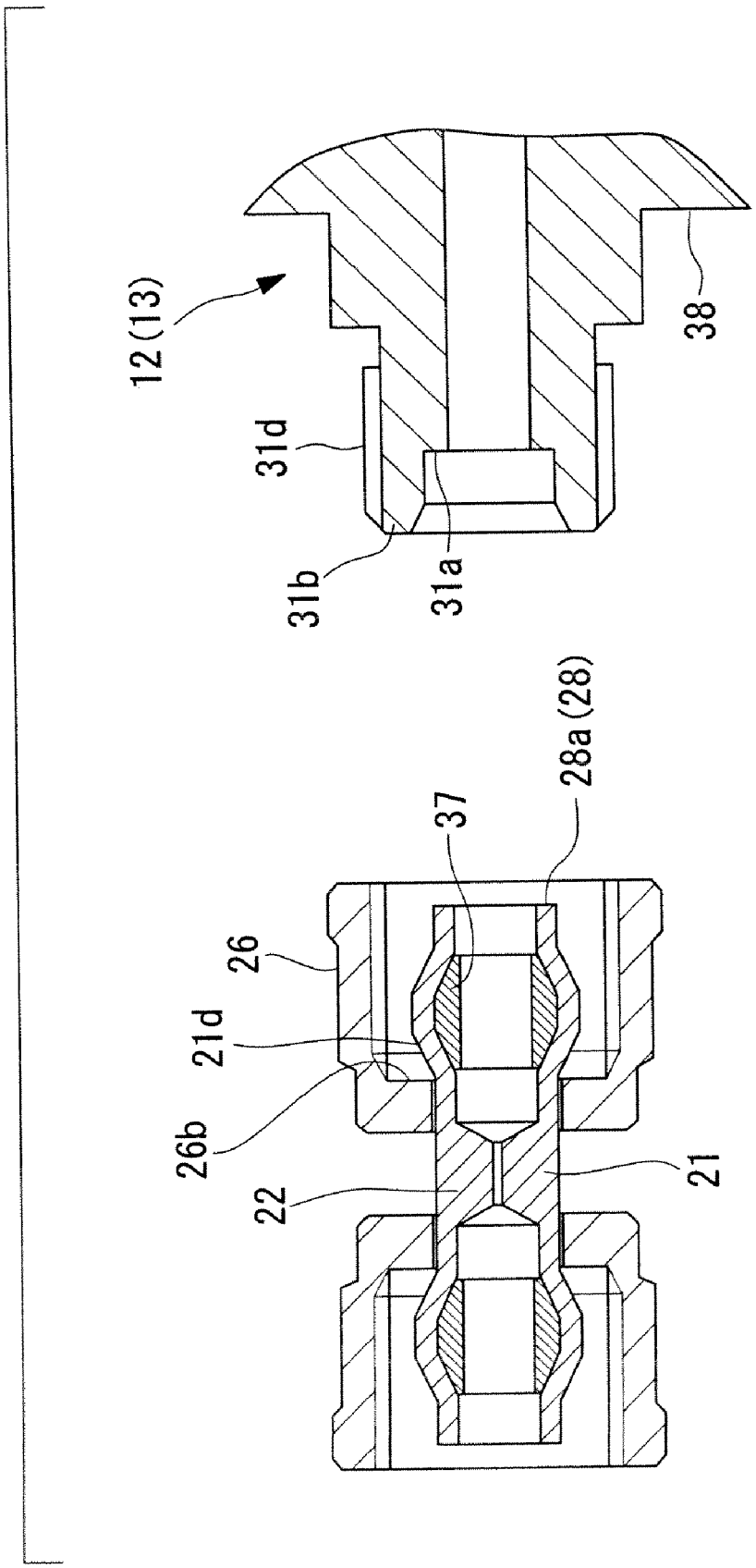
FIG. 4 is a longitudinal cross-sectional view illustrating another example of the flow-regulating device according to the first embodiment of the present invention.
Figure 5:
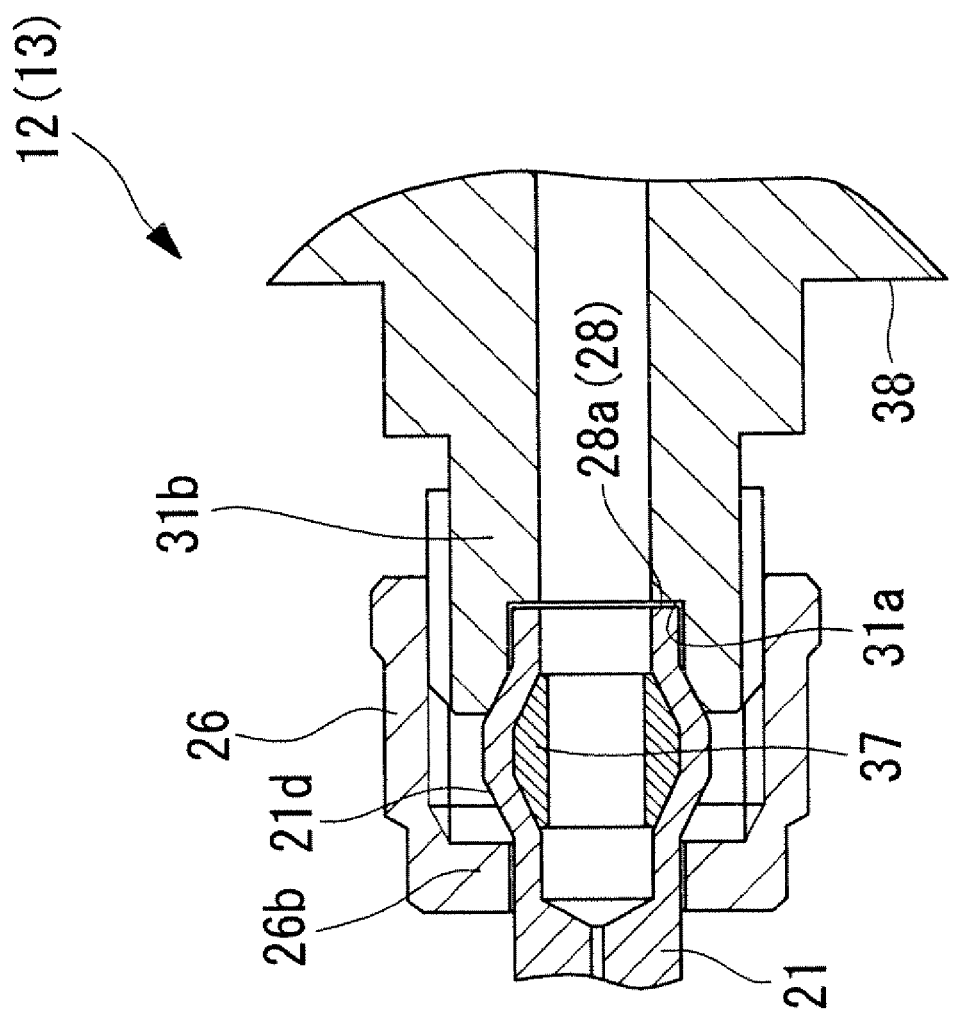
FIG. 5 is a longitudinal cross-sectional view illustrating the connection structures of the orifice member of the flow-regulating device and the first and second pressure-measuring devices according to another example of the first embodiment of the present invention.

According to this embodiment, the sleeve 27 is structured to include the engagement portion 28. However, the embodiment is not limited thereto, and instead of the sleeve 27, a ring-shaped sleeve 37 that does not include an engagement portion 28 may be inserted farther than the end of the tube portion 21 to form a large-diameter portion 21d in the tube portion 21, as shown in FIGS. 4 and 5.

In such a case, the engagement portion 28 is formed by the end of the tube portion 21 (however, the cylindrical portion 28b is not provided, and the end of the tube portion 21 functions as the contact surface 28a). Moreover, each of the first pressure-measuring device 12 and the second pressure-measuring device 13 includes, instead of the housing 31, a housing 38 that has a structure in which the depressed portion 31c is eliminated from the housing 31.

Second Embodiment

A second embodiment of a flow-regulating device according to the present invention will be described below with reference to FIGS. 6 and 7.

Figure 6:
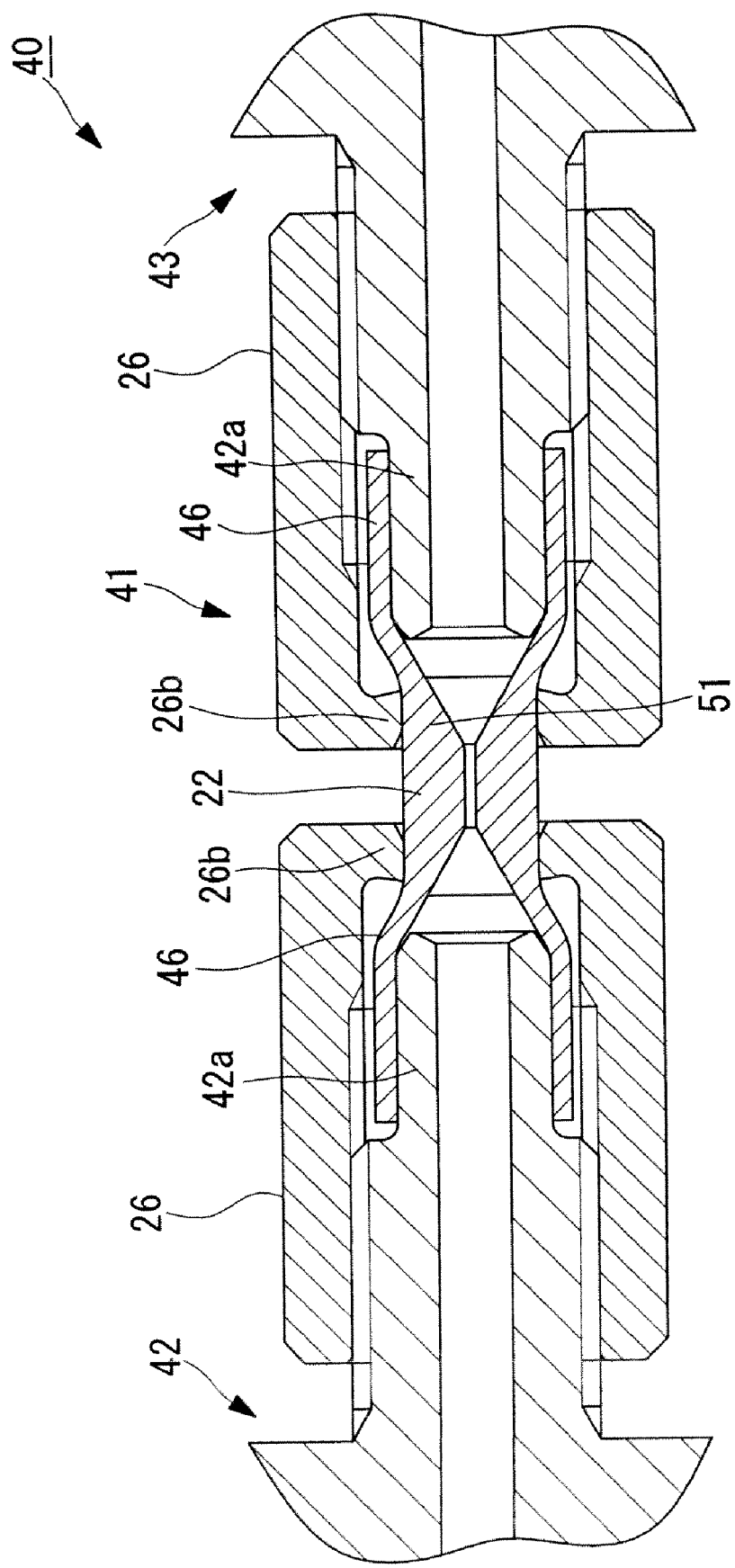
FIG. 6 is a longitudinal cross-sectional view illustrating the structures and the connection structures of an orifice member of a flow-regulating device and first and second pressure-measuring devices according to a second embodiment of the present invention.

As shown in FIG. 6, a flow-regulating device 40 according to this embodiment is mainly characterized in that, instead of the orifice member 11, the first pressure-measuring device 12, and the second pressure-measuring device 13 of the flow-regulating device 10 according to the first embodiment, an orifice member 41, a first pressure-measuring device 42, and a second pressure-measuring device 43 having connection structures, for connecting to each other, that are different from those in the flow-regulating device 10 are provided.

Hereinafter, members that are the same or similar to those according to the first embodiment are represented by the same reference numerals, and detailed descriptions thereof are omitted.

Figure 7:
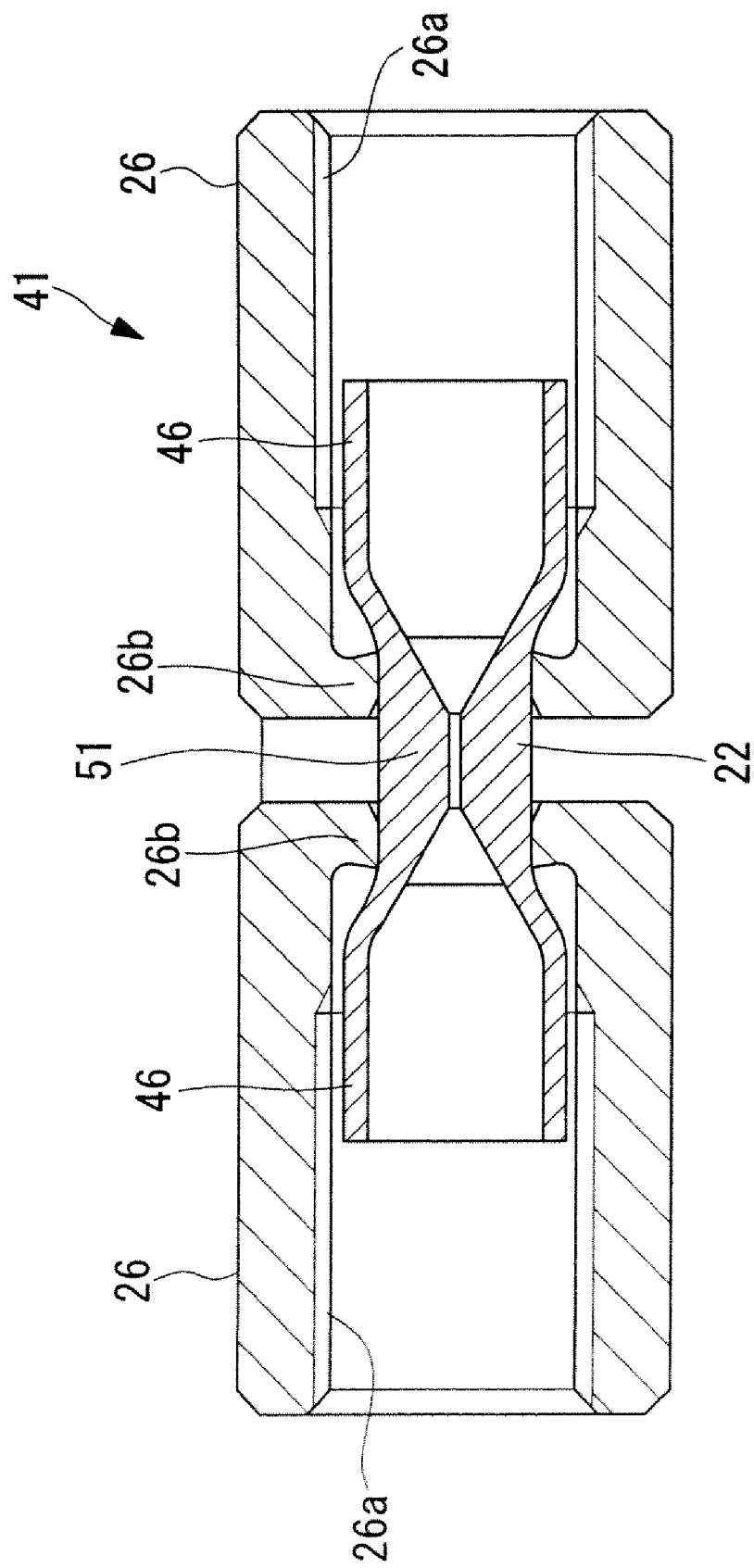
FIG. 7 is a longitudinal cross-sectional view illustrating the structures of the orifice member of the flow-regulating device according to the second embodiment of the present invention.

As shown in FIG. 7, the orifice member 41 is mainly characterized in that, instead of the tube portion 51 and the sleeve 27 of the orifice member 11 according to the first embodiment, a tube portion 51 is provided, being structured such that each end inserted into the nut 26 is a large-diameter portion 46 internally receiving a connection end, described below, of the first pressure-measuring device 42 or the second pressure-measuring device 43 by being flexible and wider than other parts, and the engagement protrusion 26b of the nut 26 engages with the this large-diameter portion 46.

Here, since the end of the tube portion 51 is flexible and deformable, it can be easily passed through the nut 26.

The first pressure-measuring device 42 is mainly characterized in that the contact surface 31a and the depressed portion 31c in the first pressure-measuring device 12 according to the first embodiment are not provided, and an insertion portion 42a that is inserted into the large-diameter portion 46 of the tube portion 51 is provided at the tip of the cylindrical portion 31b.

The second pressure-measuring device 43 has substantially the same structure as the first pressure-measuring device 42, except that the flow-regulating valve 14 is connected instead of the fluid transportation pipe W; and, thus, detailed descriptions thereof are omitted.

In the flow-regulating device 40 having the above-described structure, the ends of the tube portion 51 of the orifice member 41 face the insertion portions 42a of the first pressure-measuring device 42 and the second pressure-measuring device 43, and the insertion portions 42a are inserted into the large-diameter portions 46 of the tube portion 51. By internally receiving the insertion portions 42a, deformation is restricted so that the large-diameter portions 46 engage with the engagement protrusion 26b provided on the inner circumferential surface of the nut 26.

With the insertion portion 42a inserted into the large-diameter portion 46, the nut 26 through which the tube portion 51 is passed is engaged with a male threaded portions 31d formed on the cylindrical portions 31b of the first pressure-measuring device 42 or the second pressure-measuring device 43, and the nut 26 is tightened. In this way, the large-diameter portion 46 of the tube portion 51 moves relatively closer to the cylindrical portions 31b, together with the nut 26. With the nut 26 sufficiently tightened, the large-diameter portion 46 of the tube portion 51 and the insertion portion 42a are fixed in an airtight, liquid-tight manner.

In contrast, by loosening the nut 26, the end of the tube portion 51 and the connection end of each pressure-measuring device 42, 43 are freed.

In other words, the orifice member 41 can be easily connected to or disconnected from each pressure-measuring device 42, 43 by moving the nut 26.

Third Embodiment

Figure 8:
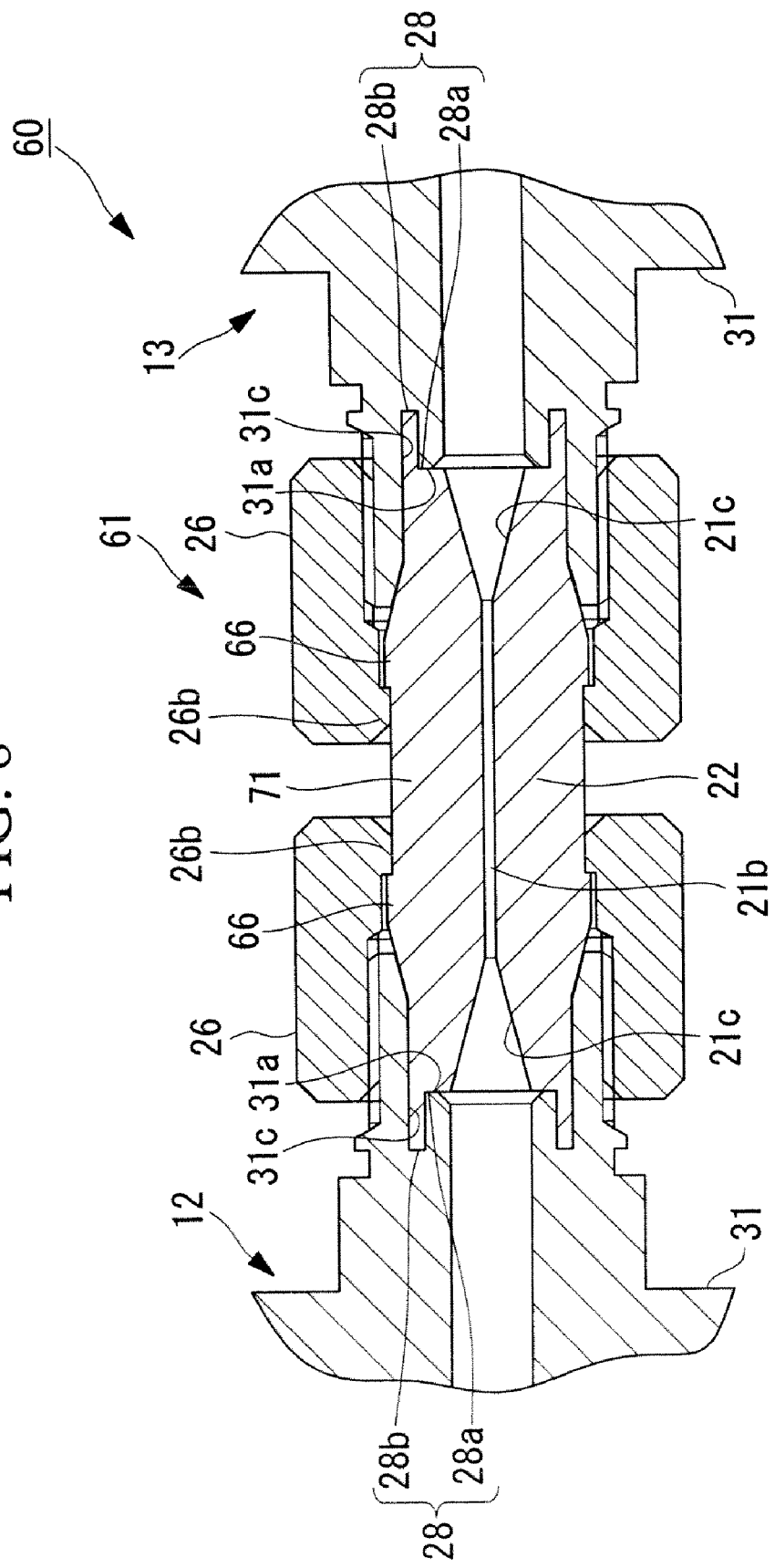
FIG. 8 is a longitudinal cross-sectional view illustrating the structures and the connection structures of an orifice member of a flow-regulating device and first and second pressure-measuring devices according to a third embodiment of the present invention.
Figure 9:
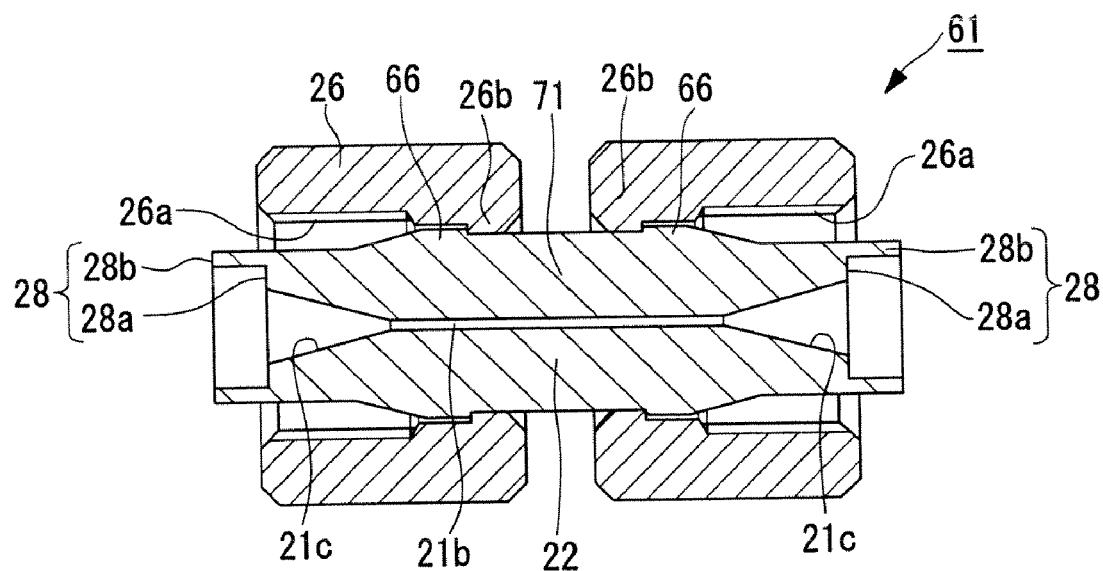
FIG. 9 is a longitudinal cross-sectional view illustrating the structure of the orifice member of the flow-regulating device according to the third embodiment of the present invention.

A third embodiment of a flow-regulating device according to the present invention will be described below with reference to FIGS. 8 and 9.

A flow-regulating device 60 according to this embodiment is mainly characterized in that, instead of the orifice member 11 of the flow-regulating device 10 according to the first embodiment, an orifice member 61 having different connection structures for the first and second pressure-measuring devices 12 and 13 is provided.

Hereinafter, members that are the same or similar to those according to the first embodiment are represented by the same reference numerals, and detailed descriptions thereof are omitted.

The orifice member 61 is mainly characterized in that, instead of the tube portion 21 and the sleeves 27 in the orifice member 11 according to the first embodiment, a tube portion 71 is provided, being structured such that each end is inserted into the nut 26 is rigid and a large-diameter portion 66 is formed on the outer circumferential surface of the end, and that the engagement protrusion 26b of the nut 26 engages with the large-diameter portion 66.

Moreover, similar to the sleeve 27 according to the first embodiment, at the end of the tube portion 71, a contact surface 28a and a cylindrical portion 28b that form an engagement portion 28 are integrated.

Here, in the orifice member 61, it is preferable to form at least the large-diameter portion 66 of the tube portion 71 or the engagement protrusion 26b of the nut 26 in a shape that allows the nut 26 to easily pass over the large-diameter portion 66 when the end of the tube portion 71 is inserted into the nut 26 and that reliably transmits the tightening force of the nut 26 to the large-diameter portion 66.

According to this embodiment, the large-diameter portion 66 of the tube portion 71 is formed in a shape such that the diameter of the end area of the tube portion 71 gradually decreases toward the end, and the center area in the longitudinal direction of the tube portion 71 has a surface substantially orthogonal to the axis.

In the engagement protrusion 26b of the nut 26, the side of the female threaded portion 26a in the axial direction of the nut 26 has a surface substantially orthogonal to the axis, and the diameter of the side opposite to the female threaded portion 26a in the axial direction of the nut 26 gradually decreases away from the female threaded portion 26a in the axial direction.

In the flow-regulating device 60 having such a structure, the orifice member 61 is connected to the first and second pressure-measuring devices 12 and 13 through the same process as that used for the orifice member 11 in the flow-regulating device 10 according to the first embodiment. The connection structures of the orifice member 61 and the first and second pressure-measuring devices 12 and 13 are the same as the connection structures of the orifice member 11 and the first and second pressure-measuring devices 12 and 13 according to the first embodiment.

Figure 10:
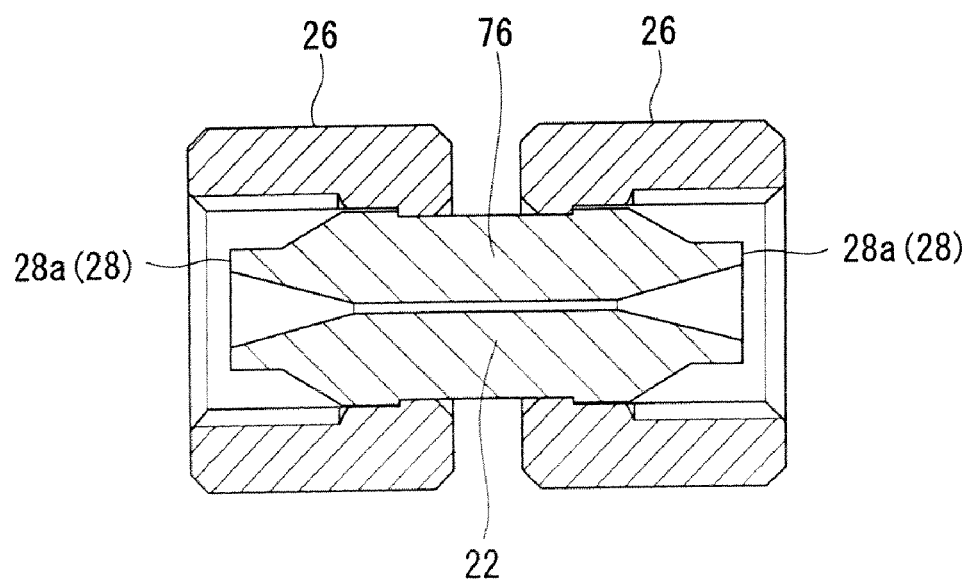
FIG. 10 is a longitudinal cross-sectional view illustrating the structures of another example of the orifice member of the flow-regulating device according to the third embodiment of the present invention.

According to this embodiment, a tube portion 71 having the cylindrical portions 28b provided at the end as single members has been described. However, the tube portion 71 is not limited thereto, and, as shown in FIG. 10, a tube portion 76 not having the cylindrical portions 28b may be used.

Figure 11:
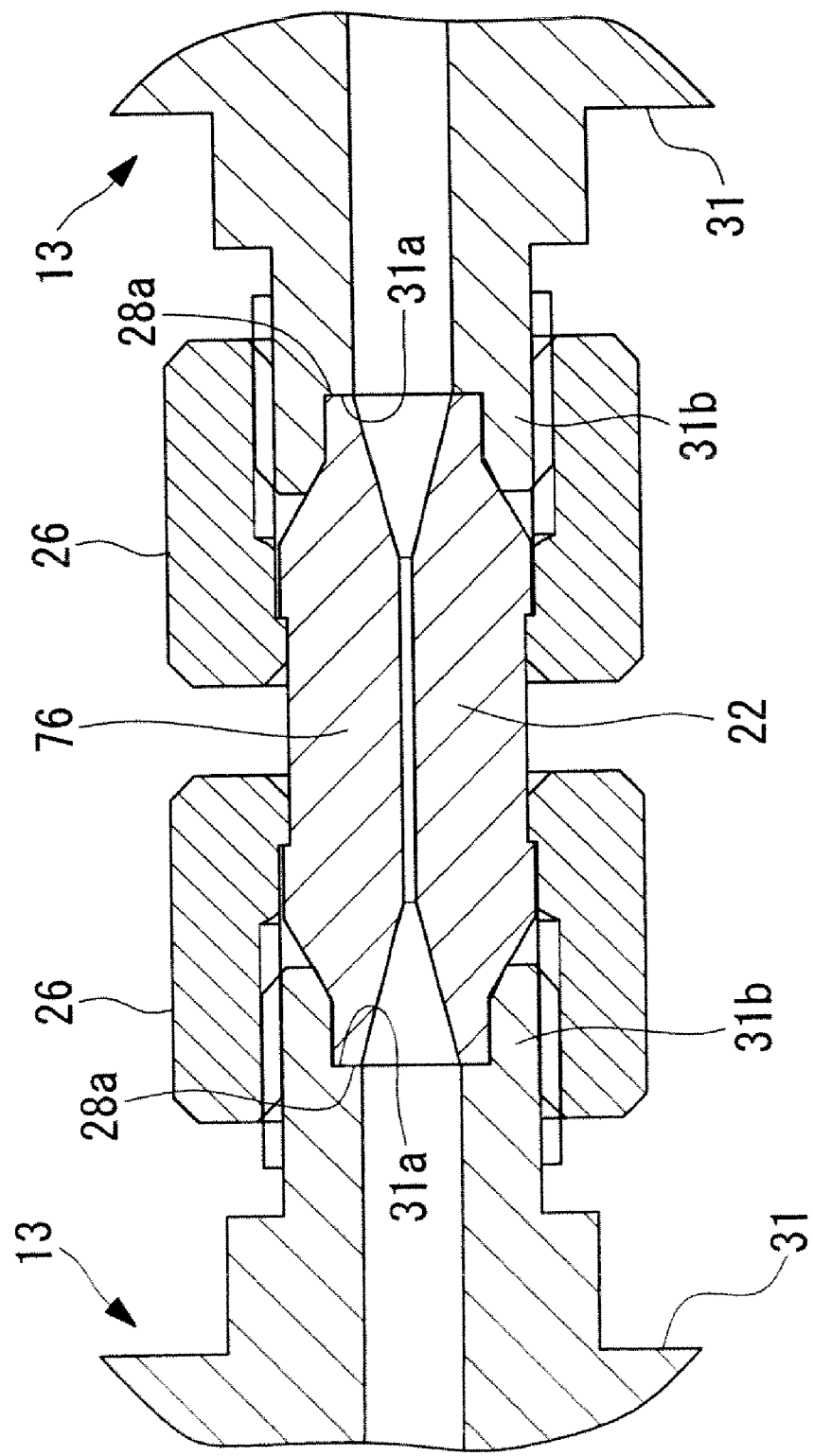
FIG. 11 is a longitudinal cross-sectional view illustrating the structures of the orifice member of the flow-regulating device and first and second pressure-measuring devices according to the third embodiment of the present invention.

In this case, each of the housings 31 of the first and second pressure-measuring devices 12 and 13 is structured without the depressed portion 31c, as shown in FIG. 11.

Fourth Embodiment

A fourth embodiment of flow-regulating devices according to the present invention will be described below with reference to FIG. 12.

A flow-regulating device 80 according to this embodiment is mainly characterized in that, instead of the orifice member 11, the first pressure-measuring device 12, and the second pressure-measuring device 13 in the flow-regulating device 10 according to the first embodiment, an orifice member 81, a first pressure-measuring device 82, and a second pressure-measuring device 83 having connection structures, for connecting to each other, that are different from those in the flow-regulating device 10 are provided.

The orifice member 81 is mainly characterized in that, the structure of the connection portions connecting to the first and second pressure-measuring devices 12 and 13 in the orifice member 11 according to the first embodiment is changed to the structure of the connection portions of the first and second pressure-measuring devices 12 and 13 connecting to the orifice member 11.

Figure 12:
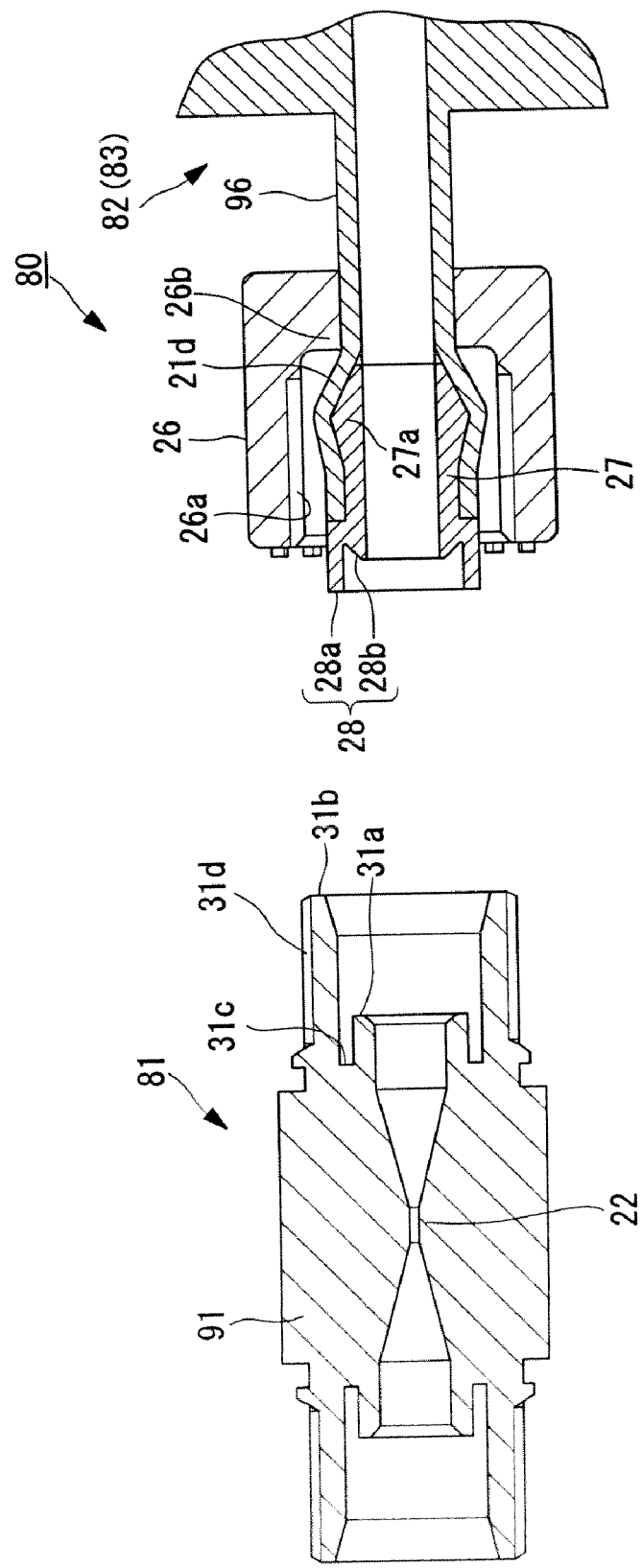
FIG. 12 is a longitudinal cross-sectional view illustrating the structures of an orifice member of a flow-regulating device and first and second pressure-measuring devices according to a fourth embodiment of the present invention.

More specifically, the orifice member 81 is the same as the orifice member 11 according to the first embodiment, except that the nut 26 and the sleeve 27 are not provided and, instead of the tube portion 21, a tube portion 91 having the structure shown in FIG. 12 is provided.

The tube portion 91 is the same as the tube portion 21 according to the first embodiment, except that both ends are rigid, and each end includes a substantially ring-shaped contact surface 31a that surrounds the open end of the channel, a cylindrical portion 31b that protrudes in the axial direction farther than the contact surface 31a and that surrounds the contact surface 31a, and a ring-shaped depressed portion 31c that is provided between the contact surface 31a and the cylindrical portion 31b. Here, on the outer circumferential surface of the cylindrical portion 31b, a male threaded portion 31d is formed.

The first pressure-measuring device 82 and the second pressure-measuring device 83 are the same as the first pressure-measuring device 12 and the second pressure-measuring device 13, respectively, according to the first embodiment, except that, instead of the contact surface 31a, the cylindrical portion 31b, the depressed portion 31c, and the male threaded portion 31d, a tube portion 96 led out from the housing, a nut 26 though which the end of the tube portion 96 is passed, and a sleeve 27 that is inserted into the end of the tube portion 96 and that forms a large-diameter portion 21d at the end of the tube portion 96 by widening the section near the end of the tube portion 96 outwards in the radial direction are provided.

Here, similar to the first embodiment, the sleeve 27 includes an engagement portion 28 that is formed of a substantially ring-shaped contact surface 28a that surrounds the open end of the channel of the sleeve 27 and is in surface contact with the end surface of a connection end of the first and second pressure-measuring devices 12 and 13, and a cylindrical portion 28b that protrudes father than the contact surface 28a and surrounds the contact surface 28a.

The orifice member 81, the first pressure-measuring device 82, and the second pressure-measuring device 83 of the flow-regulating device 80, having the above-described structure, are connected by the same connection method as the connection method of the orifice member 11, the first pressure-measuring device 12, and the second pressure-measuring device 13 of the flow-regulating device 10 according to the first embodiment (but, the male and female connection structures are reversed).

Figure 13:
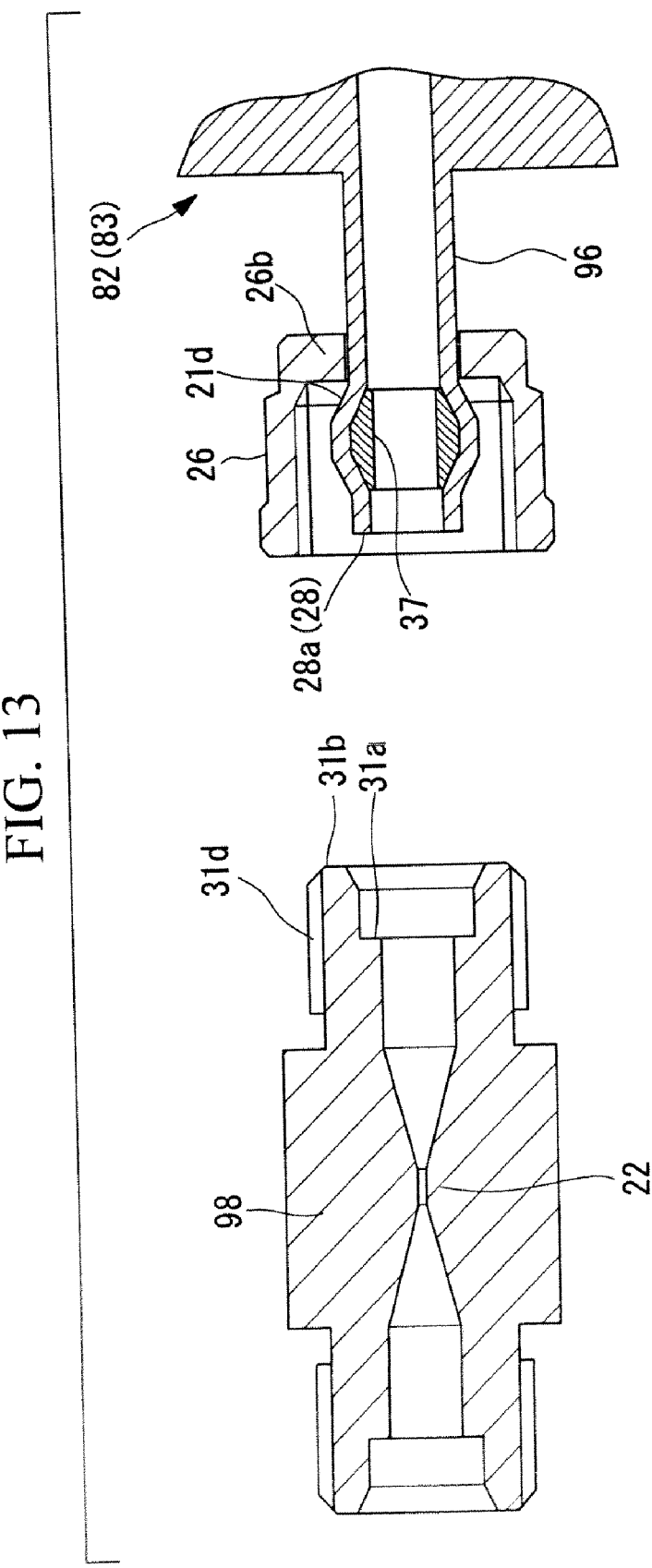
FIG. 13 is a longitudinal cross-sectional view illustrating the structures of other examples of the orifice member of the flow-regulating device and the first and second pressure-measuring devices according to the fourth embodiment of the present invention.
Figure 14:
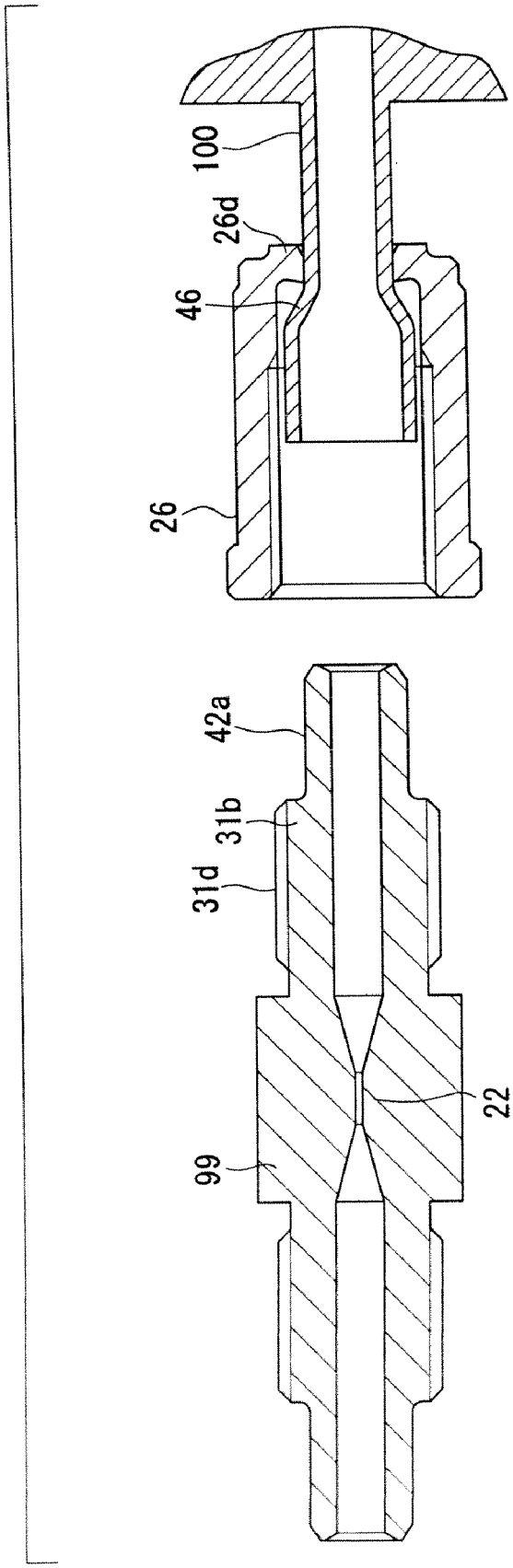
FIG. 14 is a longitudinal cross-sectional view illustrating the structures of other examples of the orifice member of the flow-regulating device and the first and second pressure-measuring devices according to the fourth embodiment of the present invention.

According to this embodiment, as shown in FIG. 13, the orifice member 81 may include, instead of the tube portion 91, a tube portion 98 having a structure in which the depressed portion 31c is eliminated from the tube portion 91.

In this case, on each of the first and second pressure-measuring devices 82 and 83, a large-diameter portion 21d is formed on the tube portion 96 by inserting a ring-shaped sleeve 37, which does not have the engagement portion 28, farther than the end of the tube portion 96. The engagement portion 28 is formed by the end of the tube portion 96 (but the cylindrical portion 28b is not provided and the end of the tube portion 96 functions as a contact surface 28a).

According to this embodiment, the orifice member 81 may include, instead of the tube portion 91, a tube portion 99 having a structure in which, in the tube portion 91, the contact surface 31a and the depressed portion 31c are not provided and an insertion portion 42a to be inserted into a large-diameter portion 46 of the tube portion 96 is provided at the tip of the cylindrical portion 31b.

In this case, in each of the first and second pressure-measuring devices 82 and 83, the sleeve 37 is not provided, and, instead of the tube portion 96, a tube portion 100 is provided, wherein the tube portion 100 has the same structure as the tube portion 96, except that the end is a large-diameter portion 46 that has flexibility, has a diameter larger than other portions, and internally accepts, which is described below, of the tube portion 91 of the orifice member 81, and except that the engagement protrusion 26b of the nut 26 is engaged with the large-diameter portion 46.

Here, since the end of the tube portion 100 is flexible and deformable, it can be easily passed through the nut 26.

In this embodiment, cases in which the connection structures at the ends of an orifice member are male and female structures have been described. However, the connection structures are not limited thereto, and one end of the orifice member may be a male connection structure and the other end may be a female connection structure.

The invention claimed is:

1. An orifice member comprising:
a tube portion whose ends are each connected to an object and whose inner section forms a channel connecting the objects; and
an orifice provided inside the tube portion,
wherein the tube portion and the orifice are integrated,
wherein, on at least one of the ends of the tube portion, a nut through which the end of the tube portion is passed and a sleeve inserted into the end of the tube portion and forming a large-diameter portion by widening the section near the end of the tube portion outwards in the radial direction are provided, and
wherein, on the inner circumferential surface of the nut, a female, threaded portion and an engagement protrusion are provided, the engagement protrusion engaging with the large-diameter portion and protruding from the center area in the longitudinal direction of the tube portion, farther inward in the radial direction than the female threaded portion.

2. The orifice member according to claim 1,
wherein at least one of the ends of the tube portion is rigid and comprises an engagement portion engaging the tube portion with a tube-portion-connecting end of the object, and
wherein a male threaded portion is provided on the outer circumferential surface of the engagement portion.

3. The orifice member according to claim 2,
wherein the end of the tube portion comprises an engagement portion having a shape for engaging with the tube-portion-connecting end of the object.

4. A differential-pressure flow meter comprising:
the orifice member according to claim 1;
a first pressure-measuring device being connected to one end of the tube portion of the orifice member; and
a second pressure-measuring device being connected to the other end of the tube portion of the orifice member.

5. A flow-regulating device comprising:
a differential-pressure flow meter using the orifice member according to claim 1; and
a flow-regulating valve being connected to the upstream or downstream side of the differential-pressure flow meter.

6. An orifice member comprising:
a tube portion whose ends are each connected to an object and whose inner section forms a channel connecting the objects; and
an orifice provided inside the tube portion;
wherein the tube portion and the orifice are integrated,
wherein, on at least one of the ends of the tube portion, a nut through which the end of the tube portion is passed is provided,
wherein the end of the tube portion passing through the nut comprises a large-diameter portion having flexibility, having a diameter larger than other sections, and internally receiving a connection end of the object, and
wherein, on the inner circumferential surface of the nut, a female threaded portion and an engagement protrusion are provided, the engagement protrusion engaging with the large-diameter portion and protruding from the center area in the longitudinal direction of the tube portion, farther inward in the radial direction than the female threaded portion.

7. A flow-regulating device comprising:
a differential-pressure flow meter using the orifice member according to claim 6; and
a flow-regulating valve being connected to the upstream or downstream side of the differential-pressure flow meter.

8. The orifice member according to claim 6,
wherein at least one of the ends of the tube portion is rigid and comprises an engagement portion engaging the tube portion with a tube-portion-connecting end of the object, and
wherein a male threaded portion is provided on the outer circumferential surface of the engagement portion.

9. The orifice member according to claim 8,
wherein the end of the tube portion comprises an engagement portion having a shape for engaging with the tube-portion-connecting end of the object.

10. A differential-pressure flow meter comprising:
the orifice member according to claim 6;
a first pressure-measuring device being connected to one end of the tube portion of the orifice member; and
a second pressure-measuring device being connected to the other end of the tube portion of the orifice member.

11. An orifice member comprising:
a tube portion whose ends are each connected to an object and whose inner section forms a channel connecting the objects; and
an orifice provided inside the tube portion;
wherein the tube portion and the orifice are integrated,
wherein, on at least one of the ends of the tube portion, a nut through which the end of the tube portion is passed is provided,
wherein the end of the tube portion passing through the nut is rigid and a large-diameter portion is provided on the outer circumferential surface, and
wherein, on the inner circumferential surface of the nut, a female threaded portion and an engagement protrusion are provided, the engagement protrusion engaging with the large-diameter portion and protruding from the center area in the longitudinal direction of the tube portion, farther inward in the radial direction than the female threaded portion.

12. The orifice member according to claim 11,
wherein the end of the tube portion comprises an engagement portion having a shape for engaging with the tube-portion-connecting end of the object.

13. A flow-regulating device comprising:
a differential-pressure flow meter using the orifice member according to claim 11; and
a flow-regulating valve being connected to the upstream or downstream side of the differential-pressure flow meter.

14. The orifice member according to claim 11,
wherein at least one of the ends of the tube portion is rigid and comprises an engagement portion engaging the tube portion with a tube-portion-connecting end of the object, and
wherein a male threaded portion is provided on the outer circumferential surface of the engagement portion.

15. The orifice member according to claim 14,
wherein the end of the tube portion comprises an engagement portion having a shape for engaging with the tube-portion-connecting end of the object.

16. A differential-pressure flow meter comprising:
the orifice member according to claim 11;
a first pressure-measuring device being connected to one end of the tube portion of the orifice member; and
a second pressure-measuring device being connected to the other end of the tube portion of the orifice member.

* * * * *